US012693867B2

(12) United States Patent
He et al.

(10) Patent No.: US 12,693,867 B2
(45) Date of Patent: Jul. 28, 2026

(54) ACCELERATOR WITH CONFIGURABLE CIRCUIT TO PERFORM DIFFERENT OPERATION TYPES

(71) Applicant: Cloud Intelligence Assets Holding (Singapore) Private Limited, Singapore (SG)

(72) Inventors: Qianwen He, Hangzhou (CN); Guiming Wu, Hangzhou (CN); Jiali Jiang, Hangzhou (CN); Zhenxiang Zhang, Hangzhou (CN); Xin Long, Hangzhou (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 0 days.

(21) Appl. No.: 18/685,072

(22) PCT Filed: Feb. 9, 2023

(86) PCT No.: PCT/CN2023/075107
§ 371 (c)(1),
(2) Date: Feb. 20, 2024

(87) PCT Pub. No.: WO2023/160399
PCT Pub. Date: Aug. 31, 2023

(65) Prior Publication Data
US 2025/0199861 A1 Jun. 19, 2025

(30) Foreign Application Priority Data
Feb. 25, 2022 (CN) .......................... 202210179799.X

(51) Int. Cl.
*G06F 9/38* (2018.01)
*G06F 7/72* (2006.01)
(Continued)

(52) U.S. Cl.
CPC ............ *G06F 9/3877* (2013.01); *G06F 7/725* (2013.01); *G06F 9/22* (2013.01); *G06F 9/30007* (2013.01); *G06F 9/3879* (2013.01)

(58) Field of Classification Search
CPC . G06F 7/58; G06F 7/721; G06F 7/722; G06F 7/723; G06F 7/725; G06F 9/22;
(Continued)

(56) References Cited

U.S. PATENT DOCUMENTS 9,891,918 B2 * 2/2018 Hooker ................. G06F 9/3848
2009/0319804 A1 12/2009 Qi et al.
(Continued)

FOREIGN PATENT DOCUMENTS

CN 110471394 A * 11/2019 ......... G05B 23/0213
CN 112099762 A 12/2020
(Continued)

OTHER PUBLICATIONS

Rodriguez-Flores et al., "A Compact FPGA-based microcoded coprocessor for exponentiation in asymmetric encryption", Jun. 15, 2017, IEEE, p. 1-4 (Year: 2017).*
(Continued)

*Primary Examiner* — Jyoti Mehta
*Assistant Examiner* — Emilio Alcantara-Ramos
(74) *Attorney, Agent, or Firm* — Osha Bergman Watanabe & Burton LLP

(57) ABSTRACT

Provided are an accelerator, an acceleration method, and an electronic device. The accelerator includes: a calculating unit including a general operation logic performing an operation of different operation types in response to different inputs; an acquiring unit, configured to acquire a target microcode instruction generated according to a target type operation to be implemented; the target microcode instruction is used to indicate target input data required to enable
(Continued)

the general operation logic to implement the target type operation; a parsing unit, configured to parse the target microcode instruction to obtain a parsing result corresponding to the target input data; and a controlling unit, configured to, in response to the parsing result, control the calculating unit to enable the calculating unit to acquire the target input data and run the general operation logic based on the target input data so as to complete the target type operation.

16 Claims, 3 Drawing Sheets

(51) Int. Cl.
 *G06F 9/22* (2006.01)
 *G06F 9/30* (2018.01)

(58) Field of Classification Search
 CPC ...... G06F 9/30; G06F 9/30007; G06F 9/3877; G06F 9/3879
 See application file for complete search history.

(56) References Cited

U.S. PATENT DOCUMENTS

| | | | |
|---|---|---|---|
| 2014/0365754 A1 | 12/2014 | Combs et al. | |
| 2016/0179177 A1* | 6/2016 | Henry | G06F 9/44505 |
| | | | 713/320 |
| 2018/0060069 A1 | 3/2018 | Rosti et al. | |

FOREIGN PATENT DOCUMENTS

| | | | |
|---|---|---|---|
| CN | 113032848 A | 6/2021 | |
| CN | 113377441 A | 9/2021 | |
| CN | 114579078 A | 6/2022 | |
| CN | 115495153 A | 12/2022 | |

OTHER PUBLICATIONS

Chen et al., "A High-Performance Unified-Field Reconfigurable Cryptographic Processor", Nov. 10, 2009, IEEE, p. 1-14 (Year: 2009).*

Hodjat et al., "A hyperelliptic curve crypto coprocessor for an 8051 microcontroller", Jan. 23, 2006, IEEE, p. 1-6 (Year: 2006).*

Leong et al., "A microcoded elliptic curve processor using FPGA technology", Feb. 19, 2003, IEEE, p. 1-10 (Year: 2003).*

Grabbe et al., "A high performance VLIW processor for finite field arithmetic", Jul. 28, 2003, IEEE, p. 1-6 (Year: 2003).*

"Optimising multiplication modulo a small prime", Stackoverflow, Jan. 27, 2012, Available at https://web.archive.org/web/20120202172852/https://stackoverflow.com/questions/9009139/optimising-multiplication-modulo-a-small-prime [Accessed Jul. 7, 2025] (Year: 2012).*

English translation of CN110471394A, Retrieved from https://worldwide.espacenet.com on Jul. 2, 2025, 38 pages (Year: 2019).*

International Search Report and Written Opinion of the International Searching Authority for International Application No. PCT/CN2023/075107, mailed May 2, 2023 (English Translation included).

European Search Report and Written Opinion, as issued in connection with International Patent Application No. --, dated Dec. 11, 2024.

Targhetta et al., The Design Space of Ultra-low Energy Asymmetric Cryptography, IEEE, 2014.

Wu et al., A High-Performance Hardware Architecture for ECC Point Multiplication over Curve25519, IEEE, 2022.

Wu et al., Topgun: An ECC Accelerator for Private Set Intersection, ACM Transactions on Reconfigurable Technology and Systems, vol. 16, No. 4, Article 52, Sep. 2023.

First Office Action received in Chinese Application No. 202210179799. X, dated Apr. 24, 2025.

* cited by examiner

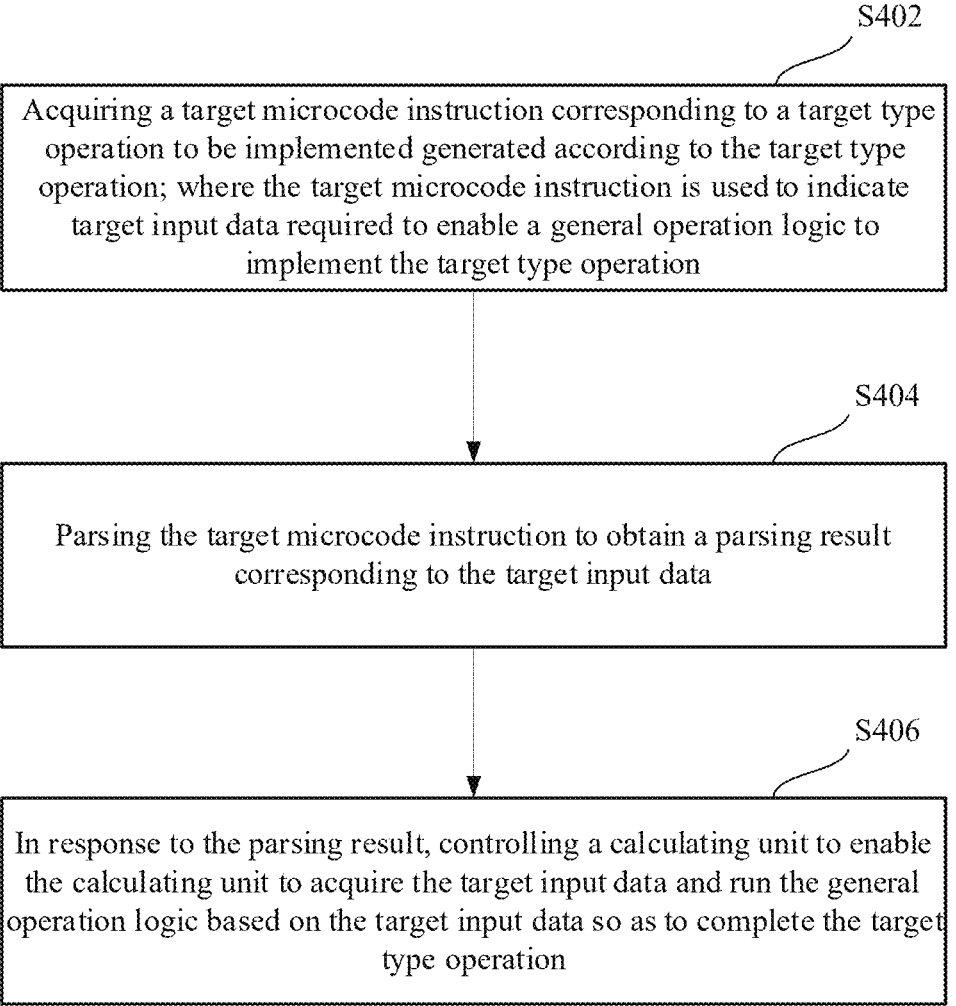

S402

Acquiring a target microcode instruction corresponding to a target type operation to be implemented generated according to the target type operation; where the target microcode instruction is used to indicate target input data required to enable a general operation logic to implement the target type operation

S404

Parsing the target microcode instruction to obtain a parsing result corresponding to the target input data

S406

In response to the parsing result, controlling a calculating unit to enable the calculating unit to acquire the target input data and run the general operation logic based on the target input data so as to complete the target type operation

FIG. 4

ACCELERATOR WITH CONFIGURABLE CIRCUIT TO PERFORM DIFFERENT OPERATION TYPES

CROSS-REFERENCE TO RELATED APPLICATIONS

The present application is a National Stage of International Application No. PCT/CN2023/075107, filed on Feb. 9, 2023, which claims priority to Chinese Patent Application No. 202210179799.X, filed with China National Intellectual Property Administration on Feb. 25, 2022 and entitled "ACCELERATOR, ACCELERATION METHOD, AND ELECTRONIC DEVICE", all of which are hereby incorporated by reference in their entireties.

TECHNICAL FIELD

The present application relates to the computer technology and, in particular, to an accelerator, an acceleration method, and an electronic device.

BACKGROUND

ECC (Elliptic Curves Cryptography) is a main trend asymmetric cryptography algorithm that is widely apply to many security fields, such as a secure transmission, a key exchange, a digital signature, a privacy calculation, a secure multi-party calculation, etc. The ECC algorithm includes a dot multiplication, a modular addition, a modular multiplication, a modular subtraction and other operations. The dot multiplication operation can be implemented by several modular additions, modular multiplications, modular subtractions, etc. The ECC algorithm is currently implemented through an accelerator.

Related art 1: each calculation link of the accelerator is strictly controlled by a state machine to implement a specific calculation process to achieve a specific function. Since control and modification of the state machine is relatively cumbersome, these accelerators can only achieve the specific function and are not flexible enough to use.

Related art 2: different calculating units in the accelerator are called through different instructions to implement operations such as the dot multiplication, the modular multiply, and the modular addition respectively, which leads to a waste of a hardware resource.

SUMMARY

Based on this, the present application at least discloses an accelerator. The accelerator includes a calculating unit configured to implement an operation related to an elliptic curves algorithm; where the calculating unit includes a general operation logic composed of a basic operation logic; the general operation logic perform the operation of different operation types in response to different inputs; the accelerator further includes: an acquiring unit, configured to acquire a target microcode instruction corresponding to a target type operation to be implemented generated according to the target type operation; where the target microcode instruction is used to indicate target input data required to enable the general operation logic to implement the target type operation; a parsing unit, configured to parse the target microcode instruction to obtain a parsing result corresponding to the target input data; and a controlling unit, configured to, in response to the parsing result, control the calculating unit to enable the calculating unit to acquire the target input data and run the general operation logic based on the target input data so as to complete the target type operation.

In some embodiments, the accelerator is communicatively connected to a central processing unit (CPU); the accelerator or the CPU is configured to: acquire an operation program that performs the target type operation on an operand; and generate the target microcode instruction corresponding to the target type operation according to the target type operation based on the operand included in the operation program.

In some embodiments, the accelerator further includes a data storage space; the data storage space stores a preset operand used to generate a microcode instruction; the accelerator or the CPU is further configured to: store the operand obtained by parsing in the data storage space; and generate the target microcode instruction according to the target type operation based on a storage address of the operand and/or the preset operand in the data storage space.

In some embodiments, the parsing result includes a storage address of the target input data; the controlling unit is configured to control, according to the storage address, the calculating unit to read the target input data from the data storage space and perform the target type operation based on the target input data.

In some embodiments, the basic operation logic includes a modular addition operation and a modular multiplication operation, the general operation logic is to perform a modular multiplication on a calculation result of two modular addition operations.

In some embodiments, an input required by the general operation logic includes a first input, a second input, a third input and a fourth input; an operation process of the general operation logic includes: performing a modular addition operation on the first input and the second input to obtain a first modular addition result; performing a modular addition operation on the third input and the fourth input to obtain a second modular addition result; and performing a modular multiplication operation on the first modular addition result and the second modular addition result to obtain a final calculation result.

In some embodiments, the operand includes a first operand and a second operand; the accelerator or the CPU is further configured to: in response to the target type operation being a modular addition operation on the first operand and the second operand, set the first input to the first operand, set the second input to the second operand, set the third input to 1 and set the fourth input to 0; in response to the target type operation being a modular subtraction operation on the first operand and the second operand, set the first input to the first operand, set the second input to the second operand and adjust a symbol corresponding to the second input to a negative sign, set the third input to 1 and set the fourth input to 0; in response to the target type operation being a modular multiplication operation on the first operand and the second operand, set the first input to the first operand, and set the third input to the second operand, and set the second input and the fourth input to 0; in response to the target type operation being a modular addition squared operation on the first operand and the second operand, set the first input and the third input to the first operand, and set the second input and the fourth input to the second operand; and generate the target microcode instruction according to the first input, the second input, the third input and the fourth input.

In some embodiments, the operation program further includes a dot multiplication scalar; the target type operation is a dot multiplication operation on the dot multiplication scalar and the operand; the accelerator or the CPU is further configured to: generate a plurality of target microcode instructions for implementing the dot multiplication operation according to the dot multiplication scalar and the operand included in the operation program; the accelerator is further configured to: control the calculating unit to execute each target microcode instruction in the plurality of target microcode instructions, so as to complete the dot multiplication operation.

In some embodiments, the modular multiplication operation includes a modular multiplication operation of a first type and a modular multiplication operation of a second type; the accelerator further includes a data storage space; the data storage space stores a preset constant; the preset constant is used to mutual convert between a first data field and a second data field; the first data field is used for the modular multiplication operation of the first type; the second data field is used for the modular multiplication operation of the second type; the calculating unit is configured to, in response to the modular multiplication operation converting from the first type to the second type, acquire the preset constant and convert the first data field into the second data field according to the preset constant to implement the modular multiplication operation of the second type; in response to the modular multiplication operation converting from the second type to the first type, acquire the preset constant and convert the second data field into the first data field according to the preset constant to implement the modular multiplication operation of the first type.

In some embodiments, the controlling unit includes a breakpoint subunit; the breakpoint subunit is configured to interrupt the calculating unit to execute subsequent microcode instruction in response to reception of a interrupt instruction, so as to enable a debugging unit corresponding to the accelerator to acquire a calculation result of the calculating unit, and output a comparison result between calculation result and a preset calculation result.

In some embodiments, the accelerator is a coprocessor implemented based on FPGA or ASIC for accelerating the elliptic curves algorithm; or an auxiliary accelerating module implemented based on CPU for performing an algorithm acceleration for the elliptic curves algorithm.

The present application also proposes an accelerating method, applied to the accelerator. the accelerator includes a calculating unit configured to implement an operation related to an elliptic curves algorithm; where the calculating unit includes a general operation logic composed of a basic operation logic; the general operation logic perform the operation of different operation types in response to different inputs; the methods includes: acquiring a target microcode instruction corresponding to a target type operation to be implemented generated according to the target type operation; where the target microcode instruction is used to indicate target input data required to enable the general operation logic to implement the target type operation; parsing the target microcode instruction to obtain a parsing result corresponding to the target input data; and in response to the parsing result, controlling the calculating unit to enable the calculating unit to acquire the target input data and run the general operation logic based on the target input data so as to complete the target type operation.

The present application also proposes an electronic device, the electronic device includes the accelerator as shown in any one of the above-mentioned embodiments.

In the above-mentioned method, first, the target microcode instruction can be generated according to the target type operation to be implemented, and the relevant configuration of the input required for the general operation logic to implement the target type operation in the calculating unit is completed according to the target microcode instruction, so as to enable the accelerator to complete the target type operation. Compared with related art 1, the accelerator can perform different type operations by changing the microcode instruction, which simplifies the configuration operation on the accelerator and reduces the difficulty of configuring the accelerator, thereby the accelerator can be used more flexible.

Second, the general operation logic composed of the basic operation logic is deployed in the calculating unit; the general operation logic perform the operation of different operation types in response to different inputs. Compared with related art 2, at least two types of operations can be implemented by one calculating unit, thereby saving the hardware resource.

It should be understood that the above-mentioned general description and the following detailed description are exemplary and explanatory only, and do not limit the present application.

BRIEF DESCRIPTION OF DRAWINGS

To describe the technical solutions in one or more embodiments of the present application or related arts more clearly, the following briefly introduces the accompanying drawings needed for describing the embodiments or the related arts. Apparently, the accompanying drawings in the following description illustrate merely some embodiments recorded in one or more embodiments of the present application, and persons of ordinary skill in the art may still derive other drawings from these accompanying drawings without creative effort.

FIG. 4 is a schematic flowchart of an accelerating method shown in an embodiment of the present application.

DESCRIPTION OF EMBODIMENTS

Figure 1:
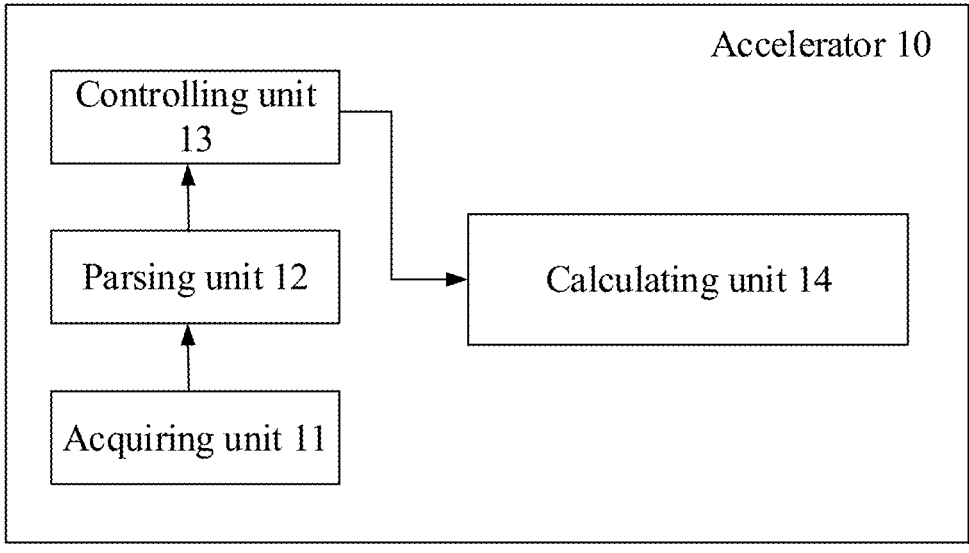
FIG. 1 is a schematic structural diagram of an accelerator shown in an embodiment of the present application.

Exemplary embodiments will be described in detail below, examples of which are illustrated in the accompanying drawings. When the following description refers to the drawings, same number in different drawings refer to the same or similar element unless otherwise indicated. The implementations described in the following exemplary embodiments do not represent all implementations consistent with the present application. On the contrary, they are merely examples of devices and methods consistent with some aspects of the present application as detailed in the appended claims.

The term used in the present application is merely for the purpose of describing particular embodiments and is not intended to limit the present application. As used in the present application and the appended claims, the singular forms "a", "the" and "this" are intended to include the plural forms as well, unless the context clearly dictates otherwise. It should also be understood that the term "and/or" as used herein refers to and includes any and all possible combinations of one or more of the associated listed items. It should also be understood that the word "if" as used herein, depending on the context, may be interpreted as "based on that . . . " or "when . . . " or "in response to determination of . . . ".

Based on this, the present application proposes an accelerator. The accelerator includes a calculating unit configured to implement an operation related to an elliptic curves algorithm; where the calculating unit includes a general operation logic composed of a basic operation logic; the general operation logic perform the operation of different operation types in response to different inputs; the accelerator further includes: an acquiring unit, configured to acquire a target microcode instruction corresponding to a target type operation to be implemented generated according to the target type operation; where the target microcode instruction is used to indicate target input data required to enable the general operation logic to implement the target type operation; a parsing unit, configured to parse the target microcode instruction to obtain a parsing result corresponding to the target input data; and a controlling unit, configured to, in response to the parsing result, control the calculating unit to enable the calculating unit to acquire the target input data and run the general operation logic based on the target input data so as to complete the target type operation.

In the above-mentioned method, first, the target microcode instruction can be generated according to the target type operation to be implemented, and the relevant configuration of the input required for the general operation logic to implement the target type operation in the calculating unit is completed according to the target microcode instruction, so as to enable the accelerator to complete the target type operation. Compared with related art 1, the accelerator can perform different type operations by changing the microcode instruction, which simplifies the configuration operation on the accelerator and reduces the difficulty of configuring the accelerator, thereby the accelerator can be used more flexible.

Second, the general operation logic composed of the basic operation logic is deployed in the calculating unit; the general operation logic perform the operation of different operation types in response to different inputs. Compared with related art 2, at least two types of operations can be implemented by one calculating unit, thereby saving the hardware resource.

Reference please be made to FIG. 1. FIG. 1 is a schematic structural diagram of an accelerator shown in an embodiment of the present application.

As shown in FIG. 1, the accelerator 10 may include an acquiring unit 11, a parsing unit 12, a controlling unit 13, and a calculating unit 14 connected in sequence. Where the calculating unit 14 includes a general operation logic composed of a basic operation logic; the general operation logic perform the operation of different operation types in response to different inputs.

The accelerator can implement ECC acceleration based on a combination of hardware and software. Various functional units included in the accelerator may be a hardware unit, a software apparatus unit, or a unit combined a software apparatus and a hardware.

In some embodiments, the accelerator is implemented based on a coprocessor or a CPU; where the accelerator is a coprocessor implemented based on FPGA or ASIC for accelerating an elliptic curves algorithm; or an auxiliary accelerating module implemented based on CPU for performing an algorithm acceleration for the elliptic curves algorithm.

The acquiring unit 11 can acquire a target microcode instruction corresponding to a target type operation to be implemented generated according to the target type operation; the target microcode instruction is used to indicate target input data required to enable the general operation logic to implement the target type operation.

The target type operations may be operations related to the elliptic curves algorithm. In some embodiments, the target type operation may include at least one of the following:

a modular addition; a modular subtraction; a modular multiplication; a modular addition squared; a modular subtraction squared; a modular addition multiplying modular subtraction; a modular addition multiplying modular addition; and a modular subtraction multiplying modular subtraction.

The target microcode instruction is used to trigger the accelerator 10 to complete the target type operation. Since the simplicity of logic and ease of writing, the microcode instruction can simplify the development difficulty for developers.

The target microcode instructions may indicate the target input data in at least two manners as following. First, the target microcode instruction directly carries the target input data; second, the target microcode instruction carries a storage address of the target input data.

In some manners, the target microcode instruction may be a program instruction manually written according to a requirement. The target microcode instruction can be sent to the acquiring unit 11 via a configuration bus after being encoded by an encoder. The accelerator may acquire the target microcode instruction through the acquiring unit 11.

In some manners, the target microcode instruction can be an instruction obtained after performing a conversion operation on an operation program in a non-manual manner. The operation program is a code program written according to requirement. The conversion operation may be performed in the accelerator 10 or the CPU communicatively connected to the accelerator. After completing the conversion operation, the target microcode instruction may be sent to the acquiring unit 11.

The accelerator or the CPU may be configured to: acquire an operation program that performs the target type operation on an operand; and generate the target microcode instruction corresponding to the target type operation according to the target type operation based on the operand included in the operation program. Thereby, a conversion operation is performed on the operation program in a non-manual manner to generate a target operation that can enable the accelerator to perform the target type operation, which eliminates the need for developers to understand the internal operation logic of the accelerator, simplifies the difficulty of developing code, and thus improves the practicality of the accelerator.

In some manners, a configuration rule of the input data required by the calculating unit to implement each type of operation can be maintained in advance. When performing the conversion operation, a corresponding target configuration rule can be determined according to the target type operation, and then the input data is configured for the target microcode instruction according to the target configuration rule and the operand to generate the target microcode instruction.

The parsing unit 12 can parse the target microcode instruction and obtain a parsing result corresponding to the target input data.

In some embodiments, the acquiring unit 11 can store the acquired target microcode instructions in a preset instruction storage space. The parsing unit 12 can acquire an unexecuted target microcode instruction from the instruction storage space, and perform relevant parsing to obtain the parsing result.

If the target microcode instruction directly carries target input data, the parsing result includes the target input data.

If the target microcode instruction carries the storage address of the target input data, the parsing result includes the storage address.

In some embodiments, the parsing unit 12 can also parse an instruction type of the target microcode instruction to assist the controlling unit 13 to execute the microcode instruction. For example, some microcode instructions may be data movement (MOV) instructions. At this time, the controlling unit 13 only need to execute the data movement operation, and does not need to control the calculating unit to perform a calculation. For another example, some microcode instructions may involve a subtraction operation (such as the modular subtraction, the modular addition multiplying modular subtraction, the modular subtraction squared, etc.), and the controlling unit 13 can control the calculating unit to adjust the symbol of the acquired input data to a negative sign.

The controlling unit 13 can, in response to the parsing result, control the calculating unit 14 to enable the calculating unit 14 to acquire the target input data and run the general operation logic based on the target input data to complete the target type operation.

If the parsing result includes the target input data, the calculating unit can acquire the target input data from the parsing result.

If the parsing result includes a storage address of the target input data, the calculating unit can read the target input data from a data storage space according to the storage address.

In some embodiments, the basic operation logic includes a modular addition operation and a modular multiplication operation, the general operation logic is to perform a modular multiplication on a calculation result of two modular addition operations. Thereby at least two operations can implement through one general operation logic.

For example, the general operation logic is expressed as $((A+B)\mod(p)*(C+D)\mod(p))\mod(p)$. If C is set to 0 and D is set to 1, the general operation logic can become $(A+B)\mod(p)$, which is equivalent to perform the modular addition operation on A and B. If B and D are set to 0, the general operation logic can become $(A*C)\mod(p)$, which is equivalent to perform the modular multiplication operation on A and C.

In some embodiments, the basic operation logic includes the modular addition operation and the modular multiplication operation, an input required by the general operation logic includes a first input, a second input, a third input and a fourth input;

an operation process of the general operation logic includes:

performing a modular addition operation on the first input and the second input to obtain a first modular addition result;

performing a modular addition operation on the third input and the fourth input to obtain a second modular addition result; and performing a modular multiplication operation on the first modular addition result and the second modular addition result to obtain a final calculation result.

Through the above-mentioned design of the calculating unit, the calculating unit can respond to the input data indicated by different microcode instructions and implement the following at least two types of operations by running the general operation logic: a modular addition; a modular subtraction; a modular multiplication; a modular addition squared; a modular subtraction squared; a modular addition multiplying modular subtraction; a modular addition multiplying modular addition; and a modular subtraction multiplying modular subtraction. This allows one calculating unit to perform multiple types of operations, thereby improving hardware utilization, and saving hardware resource.

It should be noted that solutions obtained by simply deforming the above-mentioned general operation logic are also within the protection scope of the present application.

The process of the calculating unit implementing different types of operations is further described below. It is assumed that the operand corresponding to each operation includes a first operand and a second operand, and the target microcode instruction is based on the CPU or the accelerator.

In order to simplify the explanation, the formula $((A+B)\mod(p)*(C+D)\mod(p))\mod(p)$ is used to represent the above-mentioned general operation logic of the calculating unit.

A, B, C, and D indicate the first input to the fourth input respectively. p is a data field, which means that ABCD are all in the range of 0 to p. $\mod(p)$ indicates modulo p. $(A+B)\mod(p)$ indicates to perform the modular addition operation on A and B, that is, the sum of A and B modulo p. $((A+B)\mod(p)*(C+D)\mod(p))\mod(p)$ can indicate: to perform the modular addition on A and B, to perform the modular addition on C and D, then perform the modular multiply to both of these modular addition results.

In a first operation situation, the target type operation is a modular addition operation on the first operand and the second operand.

The accelerator or the CPU is further configured to:

in response to the target type operation being a modular addition operation on the first operand and the second operand, set the first input to the first operand, set the second input to the second operand, set the third input to 1 and set the fourth input to 0; and generate the target microcode instruction according to the first input, the second input, the third input and the fourth input. It can be understood that the target microcode instruction can include the above four inputs (including the first input, the second input, the third input and the fourth input), or the storage addresses of the above four inputs.

The calculating unit 14 is further configured to:

acquire a first input, a second input, a third input and a fourth input;

perform a modular addition operation on the first input and the second input to obtain a first modular addition result;

perform a modular addition operation on the third input and the fourth input to obtain 1; and perform a modular multiplication operation on the first modular addition result and 1 to obtain a first modular addition result, so as to complete the modular addition operation for the operand.

Taking the above formula as an example, where A is the first operand, B is the second operand, C=1, D=0, $((A+B)\mod(p)*(C+D)\mod(p))\mod(p)=(A+B)\mod(p)$ is equivalent to that the calculating unit realizes the modular addition operation on the first operand and the second operand.

In the second operation situation, the target type operation is a modular subtraction operation on the first operand and the second operand.

the accelerator or the CPU is further configured to:

in response to the target type operation being a modular subtraction operation on the first operand and the second operand, set the first input to the first operand, set the second input to the second operand and adjust a symbol corresponding to the second input to a negative sign, set the third input to 1 and set the fourth input to 0; and generate the target microcode instruction according to the first input, the second input, the third input and the fourth input.

The calculating unit 14 is further configured to:

acquire a first input, a second input, a third input and a fourth input;

adjust the symbol corresponding to the second input to a negative sign in response to the target type operation being the modular subtraction operation.

perform a modular addition operation on the first input and the second input to obtain a first modular addition result;

perform a modular addition operation on the third input and the fourth input to obtain 1; and perform a modular multiplication operation on the first modular addition result and 1 to obtain the first modular addition result, so as to complete the modular subtraction operation for the operand.

Taking the above formula as an example, where A is the first operand, B is the second operand, C=1, D=0, the symbol of B is "−", ((A+B)mod(p)*(C+D)mod(p))mod(p)= (A−B)mod(p) is equivalent to that the calculating unit realizes the modular subtraction operation on the first operand and the second operand.

In the third operation situation, the target type operation is a modular multiplication operation on the first operand and the second operand.

the accelerator or the CPU is further configured to:

in response to the target type operation being a modular multiplication operation on the first operand and the second operand, set the first input to the first operand, and set the third input to the second operand, and set the second input and the fourth input to 0;

generate the target microcode instruction according to the first input, the second input, the third input and the fourth input.

The calculating unit 14 is further configured to:

acquire a first input, a second input, a third input and a fourth input;

perform a modular addition operation on the first input and the second input to obtain the first input;

perform a modular addition operation on the third input and the fourth input to obtain the third input; and perform a modular multiplication operation on the first input and the third input to obtain a calculation result, so as to complete the modular multiplication operation for the operand.

Taking the above formula as an example, where A is the first operand, C is the second operand, B=D=0, ((A+B)mod (p)*(C+D)mod(p))mod(p)=(A*C)mod(p) is equivalent to that the calculating unit realizes the modular multiplication operation on the first operand and the second operand.

In the fourth operation situation, the target type operation is a modular addition squared operation on the first operand and the second operand.

The accelerator or the CPU is further configured to:

in response to the target type operation being a modular addition squared operation on the first operand and the second operand, set the first input and the third input to the first operand, and set the second input and the fourth input to the second operand; and generate the target microcode instruction according to the first input, the second input, the third input and the fourth input.

The calculating unit 14 is further configured to:

acquire a first input, a second input, a third input and a fourth input;

perform a modular addition operation on the first input and the second input to obtain a first modular addition result;

perform a modular addition operation on the third input and the fourth input to obtain a second modular addition result; and perform a modular multiplication operation on the first modular addition result and the second modular addition result to obtain a calculation result, so as to complete the modular addition squared operation for the operand.

Taking the above formula as an example, where A=C=the first operand, B=D=the second operand, ((A+B)mod(p)*(C+ D)mod(p))mod(p)=((A+B)mod(p))2 mod(p) is equivalent to that the calculating unit realizes the modular addition squared operation on the first operand and the second operand.

With reference to the description of the four operations implemented on the calculating unit in the above-mentioned first to fourth operation situations, the calculating unit can also implement a modular subtraction squared, a modular addition multiplying modular subtraction, a modular addition multiplying modular addition, a modular subtraction multiplying modular subtraction by adjusting the above four inputs required by the general operation logic. No detailed explanation is provided here.

In some embodiments, the modular multiplication operation included in the basic operation logic includes a modular multiplication operation of a first type and a modular multiplication operation of a second type; the accelerator further comprises a data storage space; the data storage space stores a preset constant; the preset constant is used to mutual convert between a first data field and a second data field; the first data field is used for the modular multiplication operation of the first type; the second data field is used for the modular multiplication operation of the second type.

The calculating unit 14 is configured to, in response to the modular multiplication operation converting from the first type to the second type, acquire the preset constant and convert the first data field into the second data field according to the preset constant to implement the modular multiplication operation of the second type; in response to the modular multiplication operation converting from the second type to the first type, acquire the preset constant and convert the second data field into the first data field according to the preset constant to implement the modular multiplication operation of the first type.

The present application does not limit the first type and the second type. For example, the first type may be a conventional type and the second type may be a Montgomery type.

One of the differences between the two different types of modular multiplication operation is the different data fields. Data field conversion can be performed through the preset constant. For example, the preset constant is a, the first data field is 0 to p, and p+a is to obtain the second data field 0 to (p+a). By storing the preset constant in the data storage space, when the modular multiplication operation type changes, the corresponding data field can be adjusted through the preset constant, so that the calculating unit is compatible with multiple modular multiplication operation types.

Taking the first type is a conventional type and the second type is a Montgomery type as example. The preset constant used for a conversion between a Montgomery data filed and a conventional data filed can be stored in the data storage space in advance via the configuration bus. The calculating unit can implement conversion of the data filed by obtaining the preset constant to achieve compatibility of a conventional type of modular multiplication operation and a Montgomery type modular multiplication operation.

In some embodiments, the accelerator can be debugged by a debugging unit corresponding to the accelerator.

The controlling unit in the accelerator includes a breakpoint subunit

The breakpoint subunit is configured to interrupt the calculating unit to execute subsequent microcode instruction in response to reception of a interrupt instruction, so as to enable a debugging unit corresponding to the accelerator to acquire a calculation result of the calculating unit, and output a comparison result between the calculation result and a preset calculation result. Thereby, the accelerator can be debugged by monitoring the calculating process of the calculating unit.

It is assumed that the accelerator is executing multiple consecutive target microcode instructions, and these target microcode instructions include an interrupt instruction. After receiving the interrupt instruction, the breakpoint subunit can initiate an interrupt parse request to the parsing unit to interrupt the accelerator to continue executing the microcode instructions. The breakpoint subunit can further send a request to the debugging unit to enable the debugging unit to read the calculation result of the calculating unit from the data storage space via the configuration bus and compare it with the preset calculation result. If the two are consistent, a green light will be emitted through a connector; if the two are inconsistent, a red light will be emitted through the connector, which enables a developer to know an operation condition of the accelerator and facilitates debugging.

Figure 2:
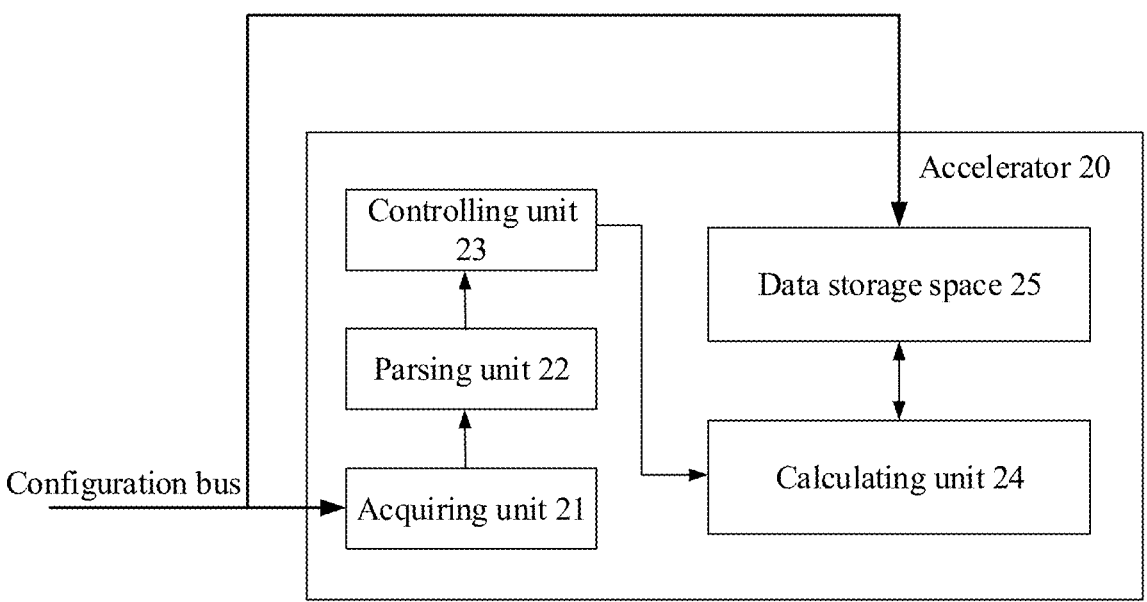
FIG. 2 is a schematic structural diagram of an accelerator shown in an embodiment of the present application.

Reference please be made to FIG. 2. FIG. 2 is a schematic structural diagram of an accelerator shown in an embodiment of the present application.

As shown in FIG. 2, the accelerator 20 may include an acquisition unit 21, a parsing unit 22, a controlling unit 23, a calculation unit 24 and a data storage space 25 connected in sequence.

The same functional units in the accelerator 20 and the above-mentioned accelerator 10 can achieve the same purpose, which will not be described in detail here.

The configuration bus illustrated in FIG. 2 can connect the accelerator 20 with other components. For example, the accelerator 20 can be connected to a CPU or a graphics processor (GPU) via the configuration bus. The transmission of data and instruction via the configuration bus can improve the stability of the transmission.

A target microcode instruction as well as a target input data that can enable the calculating unit to complete target type operation can be input to the accelerator 20 via the configuration bus. The microcode instruction may be stored in a preset instruction storage space, and the target input data may be stored in the data storage space 25.

In some manners, the target microcode instruction is obtained by converting an operation program by the accelerator or the CPU. The accelerator or the CPU is further configured to:

store the operand obtained by parsing in the data storage space; and generate the target microcode instruction according to the target type operation based on a storage address of the operand and/or the preset operand in the data storage space.

The operand is an operand parsed from the operation program and used to perform the target type operation.

The operand can be sent to the data storage space for storage via the configuration bus, and the data storage space can return the storage address corresponding to the operand. The preset operand for generating the microcode instruction can also be stored in the data storage space in advance via the configuration bus.

The preset operand can assist the calculating unit to implement the target type operation. The preset operand can be set according to a requirement, for instance, may include 0 and 1. For example, the calculating unit includes the general operation logic shown in the above-mentioned formula. If the calculating unit needs to implement a modular addition operation, then A and B can be set as operands parsed from the operation program, C can be set as a preset operand 0, and D can be set as a preset operand 1.

After the operand storage is completed, the target configuration rule for configuring each input included in the target microcode instruction can be determined according to the target type operation, then each input is configured according to the target configuration rule to generate the target microcode instruction. Specifically, each input can be configured according to storage addresses of the operand and/or the preset operand in the data storage space, and the target microcode instruction may be generated.

The target microcode instruction obtained from this may include the storage addresses of these target input data in the data storage space. In this case, the parsing result obtained by parsing the target microcode instruction may also include the storage address of the target input data. The controlling unit, according to the storage address, controls the calculating unit to read the target input data from the data storage space and perform the target type operation based on the target input data.

In some embodiments, the data storage space 25 may include a data buffer and a data register. The data buffer may include an input buffer and an output buffer. The input data transmitted by the configuration bus and the calculation result obtained by the calculating unit 24 can be stored in the data buffer and the data register as needed, and are not specifically limited in the present application. Of course, if the calculating unit 24 continuously performs multiple calculations, the intermediate calculation results can be stored in the data register, thereby improving calculation efficiency.

In some embodiments, the operation program further includes a dot multiplication scalar; the target type operation is a dot multiplication operation on the dot multiplication scalar and the operand; the accelerator or the CPU is further configured to:

generate a plurality of target microcode instructions for implementing the dot multiplication operation according to the dot multiplication scalar and the operand included in the operation program;

the accelerator is further configured to:

control the calculating unit to execute each target microcode instruction in the plurality of target microcode instructions, so as to complete the dot multiplication operation.

Thus, by parsing the operation program, the multiple target microcode instructions are obtained, and the calculating unit is controlled to implement the dot multiplication operation based on the multiple target microcode instructions.

Figure 3:
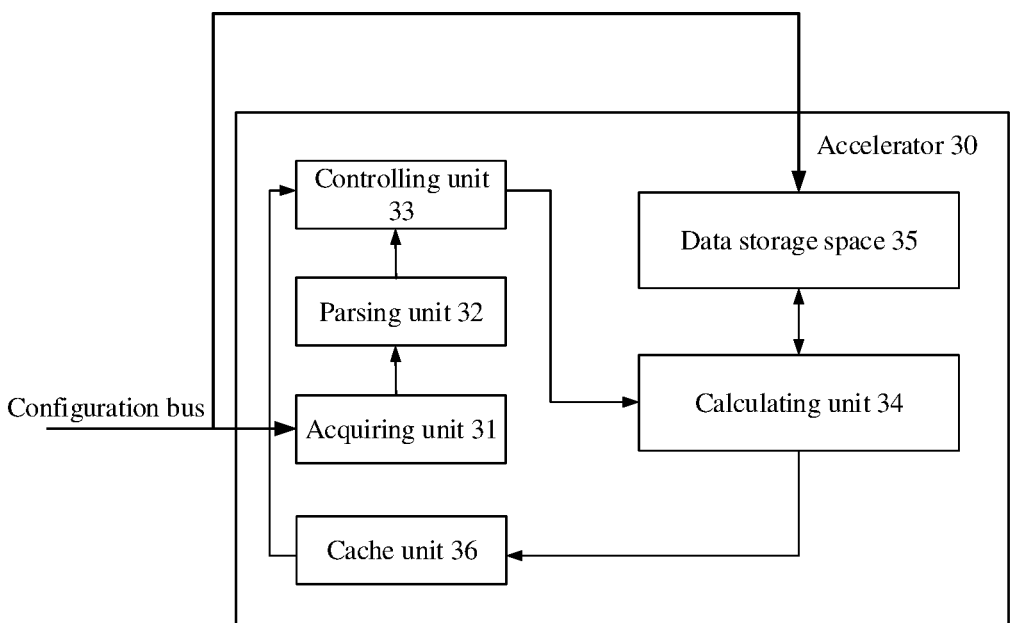
FIG. 3 is a schematic structural diagram of an accelerator shown in an embodiment of the present application.

Reference please be made to FIG. 3. FIG. 3 is a schematic structural diagram of an accelerator shown in an embodiment of the present application.

As shown in FIG. 3, the accelerator 30 may include an acquiring unit 31, an parsing unit 32, a controlling unit 33, a calculating unit 34 and a data storage space 35 connected in sequence; and a cache unit 36 connected to the controlling unit 33 and the calculating unit 34. The relevant explanations of the units 31 to 35 can refer to the above-mentioned embodiments and will not be described in detail here.

The cache unit 36 stores a dot multiplication scalar used for the dot multiplication. The dot multiplication scalar may be a preset binary number with a preset number of bits, such as a 256-bit binary number. In some ways, the dot multiplied scalar may be stored in the cache unit 36 via the configuration bus.

It can be understood that the operation process of the dot multiplication is actually to perform several simple operations based on the number of bits in each bit of the dot multiplication scalar. The simple operations may include a modular addition, a modular subtraction, a modular multiplication, a modular addition squared, a modular subtraction squared, a modular addition multiplying modular subtraction, a modular addition multiplying modular addition, and a modular subtraction multiplying modular subtraction. Therefore, in order to implement the dot multiplication operation, the multiple target microcode instructions corresponding to these simple operations respectively can be obtain by writing manually or converting the operation program by the accelerator or the CPU to control the calculating unit to complete the above-mentioned simple operations to complete the dot multiplication.

Taking the implementation of asymmetric encryption through ECC as an example to illustrate in following.

Given a base point G on an ellipse, two points d and Q on the ellipse can be selected, where Q=dG, as a private key and a public key respectively.

When the public key Q is used to encrypt a plaintext M, a random number r can be acquired, and a ciphertext C can be obtained through a formula M+rQ.

When the private key d is used to decrypt the ciphertext C, the plaintext M can be obtained by decrypting through a formula C−d(rG)=M+r(dG)−d(rG)=M.

In the above-mentioned encryption and decryption process, the dot multiplication operation (such as Rq, Dg, etc.) need to be performed frequently. ECC calculation can be performed through the accelerator shown in the above-mentioned embodiments. On the one hand, the accelerator can implement different types of operations by changing the microcode instruction, which simplifies the configuration operation of the accelerator and reduces the difficulty of configuring the accelerator, thereby use of the accelerator can be more flexible; on the other hand, at least two types of ECC operations can be implemented through one calculating unit, thereby saving hardware resource.

The present application also proposes an acceleration method, the acceleration method can be applied to the accelerator shown in any one of the above-mentioned embodiments. The accelerator includes a calculating unit configured to implement an operation related to an elliptic curves algorithm; where the calculating unit includes a general operation logic composed of a basic operation logic; the general operation logic perform the operation of different operation types in response to different inputs.

Reference please be made to FIG. 4. FIG. 4 is a schematic flowchart of an accelerating method shown in an embodiment of the present application. As shown in FIG. 4, the method may include S402-S406. Unless otherwise specified, the present application does not limit the execution order of these steps.

S402: acquiring a target microcode instruction corresponding to a target type operation to be implemented generated according to the target type operation; where the target microcode instruction is used to indicate target input data required to enable the general operation logic to implement the target type operation.

S404: parsing the target microcode instruction to obtain a parsing result corresponding to the target input data.

S406: in response to the parsing result, controlling the calculating unit to enable the calculating unit to acquire the target input data and run the general operation logic based on the target input data so as to complete the target type operation.

In the above-mentioned solution, first, the target microcode instruction can be generated according to the target type operation to be implemented, and the relevant configuration of the input required for the general operation logic to implement the target type operation in the calculating unit is completed according to the target microcode instruction, so as to enable the accelerator to complete the target type operation. Compared with related art 1, the accelerator can perform different type operations by changing the microcode instruction, which simplifies the configuration operation on the accelerator and reduces the difficulty of configuring the accelerator, thereby the accelerator can be used more flexible.

Second, the general operation logic composed of the basic operation logic is deployed in the calculating unit; the general operation logic perform the operation of different operation types in response to different inputs. Compared with related art 2, at least two types of operations can be implemented by one calculating unit, thereby saving hardware resource.

Some embodiments related to the acceleration methods are introduced below. The implementation process of these embodiments may refer to the previous embodiments regarding the accelerator, and will not be elaborated here.

In some embodiments, the accelerator is communicatively connected to a CPU; the accelerating method further includes:

acquiring an operation program that performs the target type operation on an operand; and generating the target microcode instruction corresponding to the target type operation, according to the target type operation, based on the operand included in the operation program.

In some embodiments, the accelerator further includes a data storage space; the data storage space stores a preset operand used to generate a microcode instruction;

the generating the target microcode instruction corresponding to the target type operation according to the target type operation based on the operand included in the operation program includes:

storing the operand obtained by parsing in the data storage space; and generating the target microcode instruction according to the target type operation, based on a storage address of the operand and/or the preset operand in the data storage space.

In some embodiments, the parsing result includes a storage address of the target input data;

in response to the parsing result, controlling the calculating unit to enable the calculating unit to acquire the target input data and run the general operation logic based on the target input data so as to complete the target type operation includes:

controlling, according to the storage address, the calculating unit to read the target input data from the data storage space and perform the target type operation based on the target input data.

In some embodiments, the basic operation logic includes a modular addition operation and a modular multiplication operation, the general operation logic is to perform a modular multiplication on a calculation result of two modular addition operations.

In some embodiments, an input required by the general operation logic includes a first input, a second input, a third input and a fourth input;

an operation process of the general operation logic includes:

performing a modular addition operation on the first input and the second input to obtain a first modular addition result;

performing a modular addition operation on the third input and the fourth input to obtain a second modular addition result; and performing a modular multiplication operation on the first modular addition result and the second modular addition result to obtain a final calculation result.

In some embodiments, the operand includes a first operand and a second operand;

the accelerating method further includes:

in response to the target type operation being a modular addition operation on the first operand and the second operand, setting the first input to the first operand, setting the second input to the second operand, setting the third input to 1 and setting the fourth input to 0;

in response to the target type operation being a modular subtraction operation on the first operand and the second operand, setting the first input to the first operand, setting the second input to the second operand and adjusting a symbol corresponding to the second input to a negative sign, setting the third input to 1 and setting the fourth input to 0;

in response to the target type operation being a modular multiplication operation on the first operand and the second operand, setting the first input to the first operand, and setting the third input to the second operand, and setting the second input and the fourth input to 0;

in response to the target type operation being a modular addition squared operation on the first operand and the second operand, setting the first input and the third input to the first operand, and setting the second input and the fourth input to the second operand; and generating the target microcode instruction according to the first input, the second input, the third input and the fourth input.

In some embodiments, the operation program further includes a dot multiplication scalar; the target type operation is a dot multiplication operation on the dot multiplication scalar and the operand;

the generating the target microcode instruction corresponding to the target type operation according to the target type operation based on the operand included in the operation program includes:

generating a plurality of target microcode instructions for implementing the dot multiplication operation according to the dot multiplication scalar and the operand included in the operation program;

the accelerating method further includes:

controlling the calculating unit to execute each target microcode instruction in the plurality of target microcode instructions, so as to complete the dot multiplication operation.

In some embodiments, the modular multiplication operation includes a modular multiplication operation of a first type and a modular multiplication operation of a second type; the accelerator further includes a data storage space; the data storage space stores a preset constant; the preset constant is used to mutual convert between a first data field and a second data field; the first data field is used for the modular multiplication operation of the first type; the second data field is used for the modular multiplication operation of the second type;

the accelerating method further includes:

in response to the modular multiplication operation converting from the first type to the second type, acquiring the preset constant and converting the first data field into the second data field according to the preset constant to implement the modular multiplication operation of the second type;

in response to the modular multiplication operation converting from the second type to the first type, acquiring the preset constant and converting the second data field into the first data field according to the preset constant to implement the modular multiplication operation of the first type.

In some embodiments, the accelerating method further includes:

interrupting the calculating unit to execute subsequent microcode instruction in response to reception of a interrupt instruction, so as to enable a debugging unit corresponding to the accelerator to acquire a calculation result of the calculating unit, and output a comparison result between the calculation result and a preset calculation result.

In some embodiments, the accelerator is a coprocessor implemented based on FPGA or ASIC for accelerating the elliptic curves algorithm; or an auxiliary accelerating module implemented based on CPU for performing an algorithm acceleration for the elliptic curves algorithm.

The present application also proposes an electronic device, the electronic device includes the accelerator as shown in any one of the above-mentioned embodiments. ECC acceleration is performed through the electronic device. On the one hand, the accelerator can implement different types of operations by changing the microcode instruction, which simplifies the configuration operation of the accelerator and reduces the difficulty of configuring the accelerator, thereby the accelerator can be more flexible; on the other hand, at least two types of ECC operations can be implemented through one calculating unit in the accelerator, thereby saving hardware resource.

The present application also proposes a computer-readable storage medium, where the storage medium stores a computer program, the computer program is used to enable an accelerator in a computer to execute the acceleration method shown in any of the above-mentioned embodiments.

It should be understood by those skilled in the art that one or more embodiments of the present application may be provided as a method, a system or a computer program product. Accordingly, one or more embodiments of the present application may take the form of an entirely hardware embodiment, an entirely software embodiment, or an embodiment that combines software and hardware aspects. Furthermore, one or more embodiments of the present application may employ the form of the computer program product implemented on one or more computer-usable storage mediums (which may include, but are not limited to a disk storage, a compact disc read only memory (CD-ROM), an optical storage, etc.) including computer-usable program codes therein.

"And/or" in the present application means at least one of the two. For example, "A and/or B" can include three solutions: A, B, and "A and B".

Each embodiment in the present application is described in a progressive manner. The same and similar parts between the various embodiments can be referred to each other. Each embodiment focuses on its differences from other embodiments. In particular, for the data processing device embodiment, since it is basically similar to the method embodiment, the description is relatively simple. For relevant details, please refer to the partial description of the method embodiment.

Specific embodiments of the present application have been described above. Other embodiments are within the scope of the appended claims. In some cases, the actions or steps recited in the claims can be performed in a different order than in the embodiments and still achieve desirable results. Additionally, the processes depicted in the accompanying drawings do not necessarily require the specific order as shown, or sequential order, to achieve the desirable results. In some implementations, multitasking and parallel processing are also possible or may be advantageous.

Embodiments of subject matter and functional operation described in the present application may be implemented in below: digital electronic circuits, tangibly embodied computer software or firmware, computer hardware that may include the structures disclosed in the present application and their structural equivalents, or a combination of one or more of them. Embodiments of the subject matter described in the present application may be implemented as one or more computer programs, i.e., one or more modules in a computer program instruction, encoded on a tangible non-temporary program carrier, is used to execute by a data processing device or control the operation of the data processing device. Alternatively or additionally, the program instruction can be encoded onto artificially generated propagation signals, such as machine generated electrical, optical, or electromagnetic signals, which are generated to encode information and transmit it to an appropriate receiver device for execution by the data processing device. The computer storage medium can be a machine readable storage device, a machine readable storage substrate, a random or serial access memory device, or a combination of one or more of them.

Processes and logic flows described in the present application can be performed by one or more programmable computers executing one or more computer programs to generate output to perform corresponding functions by performing operation according to input data. The processes and logic flows can also be performed by a dedicated logic circuit, such as a Field Programmable Gate Array (FPGA) or an Application Specific Integrated Circuit (ASIC), and the apparatus may also be implemented as the dedicated logic circuit.

A computer suitable for executing a computer program may include, for example, a general and/or special purpose microprocessor, or any other types of processing units. Usually, the processing units will receive instructions and data from a read-only memory and/or random access memory. The basic components of the computer may include a processing unit for implementing or executing instructions and one or more memory devices for storing instructions and data. Usually, the computer also include one or more mass storage devices for storing data, such as magnetic, magneto-optical or optical disks, etc., or the computer be operably coupled to such mass storage devices to receive data therefrom or send data to it, or both. However, the computer does not necessarily have such devices. Additionally, the computer may be embedded in another device, such as a mobile phone, a personal digital assistant (PDA), a mobile audio or video player, a game console, a global positioning system (GPS) receiver, or a portable storage device such as a universal serial bus (USB) flash drive, to name a few.

The Computer-readable medium suitable for storage of computer program instructions and data may include all forms of non-volatile memory, medium, and memory device, and may include, for example, a semiconductor memory device (such as an erasable programmable read only memory (EPROM), an electrically erasable programmable read only memory (EEPROM), and a flash memory device), a magnetic disk (such as an internal hard disk or a removable disk), a magneto-optical disk, and a CD-ROM and a digital video disk read only memory (DVD-ROM) disk. The processor and memory may be supplemented by the dedicated logic circuit or incorporated into the dedicated logic circuit.

Although the present application contains many specific implementation details, these should not be construed to limit the scope of any disclosure or claim, but rather serve primarily to describe features of particular disclosed embodiments. Certain features described in multiple embodiments herein can also be combined in a single embodiment. On the other hand, various features that are described in the single embodiment can also be implemented in multiple embodiments separately or in any suitable subcombination. Furthermore, while features may function in certain combinations as described and are even initially claimed as such, one or more features from a claimed combination may be removed from that combination in some cases, and the claimed protected combination may point to a sub-combination or a variant of the sub-combination.

Similarly, although the operations are depicted in a specific order in the accompanying drawings, this should not be understood as requiring these operations to be executed in the specific order or sequence as shown, or requiring all illustrated operations to be executed to achieve a desired result. In some cases, multitasking and parallel processing may be advantageous. Furthermore, the separation of various system modules and components in the described embodiments should not be understood as necessary in all embodiments, and it should be understood that the described program components and systems may generally be integrated together in a single software product, or packaged into multiple software products.

Thus, a specific embodiment of the subject matter have been described. Other embodiments are within the scope of the appended claims. In some cases, the actions recited in the claims can be performed in a different order and still achieve the desirable result. Furthermore, the processes depicted in the accompanying drawings are not necessarily in the specific or sequential order shown to achieve the desired result. In some implementations, multitasking and parallel processing may be advantageous.

The above are only preferred embodiments of one or more embodiments of the present application, and are not intended to limit one or more embodiments of the present application. Any modifications, equivalent substitutions, improvements, etc. have been done within the spirit and principles of one or more embodiments of the present application should be included in the scope of protection of one or more embodiments of the present application.

The invention claimed is:

1. An accelerator, comprising:

a calculating circuit configured to implement an operation related to an elliptic curves algorithm, wherein the operation related to the elliptic curves algorithm, wherein the calculating circuit comprises a general logic circuit composed of a basic logic circuit, the general logic circuit is to perform an operation of different operation types in response to different inputs; and the accelerator further comprises:

an acquiring circuit, configured to acquire a target microcode instruction corresponding to a target type operation to be implemented, the target microcode instruction is generated according to the target type operation, wherein the target microcode instruction is used to indicate target input data required to perform the general logic circuit to implement the target type operation;

a parsing circuit configured to parse the target microcode instruction to obtain a parsing result corresponding to the target input data; and a controlling circuit configured to, in response to the parsing result, control the calculating circuit to enable the calculating circuit to acquire the target input data and run the general logic circuit based on the target input data so as to complete the target type operation;

wherein the accelerator is communicatively connected to a central processing unit (CPU), and the accelerator or the CPU is configured to:

acquire an operation program that performs the target type operation on at least one operand comprised in the operation program, and generate the target microcode instruction corresponding to the target type operation according to the target type operation based on the at least one operand comprised in the operation program;

wherein the operation program further comprises a dot multiplication scalar and the target type operation is a dot multiplication operation on the dot multiplication scalar and the at least one operand;

wherein the accelerator or the CPU is further configured to generate a plurality of target microcode instructions for implementing the dot multiplication operation according to the dot multiplication scalar and the at least one operand comprised in the operation program; and wherein the accelerator is further configured to execute each target microcode instruction in the plurality of target microcode instructions, so as to complete the dot multiplication operation.

2. The accelerator according to claim 1, wherein the accelerator further comprises a data storage space, the data storage space stores a preset operand used to generate a microcode instruction, and wherein the accelerator or the CPU is further configured to:

store the at least one operand obtained by parsing in the data storage space; and generate the target microcode instruction according to the target type operation based on a storage address of the at least one operand and/or the preset operand in the data storage space.

3. The accelerator according to claim 2, wherein the parsing result comprises a storage address of the target input data; and the controlling circuit is configured to, according to the storage address of the target input data, the calculating circuit to read the target input data from the data storage space and perform the target type operation based on the target input data.

4. The accelerator according to claim 1, wherein the basic logic circuit is configured to perform a modular addition operation and a modular multiplication operation, and the general logic circuit is configured to perform a modular multiplication on a calculation result of two modular addition operations.

5. The accelerator according to claim 4, wherein an input required by the general logic circuit comprises a first input, a second input, a third input and a fourth input; and wherein an operation process of the general logic circuit comprises:

performing a modular addition operation on the first input and the second input to obtain a first modular addition result;

performing a modular addition operation on the third input and the fourth input to obtain a second modular addition result; and performing a modular multiplication operation on the first modular addition result and the second modular addition result to obtain a final calculation result.

6. The accelerator according to claim 5, wherein the at least one operand comprises a first operand and a second operand; and wherein the accelerator or the CPU is further configured to:

in response to the target type operation being a modular addition operation on the first operand and the second operand, set the first input to the first operand, set the second input to the second operand, set the third input to 1 and set the fourth input to 0;

in response to the target type operation being a modular subtraction operation on the first operand and the second operand, set the first input to the first operand, set the second input to the second operand and adjust a symbol corresponding to the second input to a negative sign, set the third input to 1 and set the fourth input to 0;

in response to the target type operation being a modular multiplication operation on the first operand and the second operand, set the first input to the first operand, and set the third input to the second operand, and set the second input and the fourth input to 0;

in response to the target type operation being a modular addition squared operation on the first operand and the second operand, set the first input and the third input to the first operand, and set the second input and the fourth input to the second operand; and generate the target microcode instruction according to the first input, the second input, the third input and the fourth input.

7. The accelerator according to claim 5, wherein the modular multiplication operation comprises a modular multiplication operation of a first type and a modular multiplication operation of a second type; and wherein the accelerator further comprises:

a data storage space;

wherein the data storage space stores a preset constant;

wherein the preset constant is used to mutually convert between a first data field and a second data field;

wherein the first data field is used for the modular multiplication operation of the first type and the second data field is used for the modular multiplication operation of the second type;

wherein the calculating circuit is configured to:

in response to the modular multiplication operation converting from the first type to the second type, acquire the preset constant and convert the first data field into the second data field according to the preset constant to implement the modular multiplication operation of the second type; and in response to the modular multiplication operation converting from the second type to the first type, acquire the preset constant and convert the second data field into the first data field according to the preset constant to implement the modular multiplication operation of the first type.

8. The accelerator according to claim 1, wherein the controlling circuit comprises a breakpoint circuit configured to interrupt the calculating circuit from executing a subsequent microcode instruction in response to reception of an interrupt instruction, so as to enable a debugging circuit corresponding to the accelerator to acquire a calculation result of the calculating circuit, and output a comparison result between the calculation result and a preset calculation result.

9. The accelerator according to claim 1, wherein the accelerator is a coprocessor implemented based on a field-programmable gate array (FPGA) or an application-specific integrated circuit (ASIC) for accelerating the elliptic curves algorithm; or an auxiliary accelerating module implemented based on a CPU for performing an algorithm acceleration for the elliptic curves algorithm.

10. An electronic device, comprising the accelerator according to claim 1.

11. An accelerating method, applied to an accelerator, wherein the accelerator comprises a calculating circuit configured to implement an operation related to an elliptic curves algorithm, wherein the calculating circuit comprises a general logic circuit composed of a basic logic circuit, and wherein the general logic circuit is configured to perform an operation of different operation types in response to different inputs, and the accelerating method comprising:

acquiring a target microcode instruction corresponding to a target type operation to be implemented, the target microcode instruction is generated according to the target type operation, wherein the target microcode instruction is used to indicate target input data required to perform the general logic circuit to implement the target type operation;

parsing the target microcode instruction to obtain a parsing result corresponding to the target input data; and in response to the parsing result, controlling the calculating circuit to enable the calculating circuit to acquire the target input data and run the general logic circuit based on the target input data so as to complete the target type operation, wherein the accelerator is communicatively connected to a central processing unit (CPU), and the accelerating method further comprises:

acquiring an operation program that performs the target type operation on at least one operand comprised in the operation program, and generating the target microcode instruction corresponding to the target type operation according to the target type operation based on the at least one operand comprised in the operation program, wherein the operation program further comprises a dot multiplication scalar and the target type operation is a dot multiplication operation on the dot multiplication scalar and the at least one operand, wherein the generating the target microcode instruction corresponding to the target type operation according to the target type operation based on the at least one operand comprised in the operation program comprises generating a plurality of target microcode instructions for implementing the dot multiplication operation according to the dot multiplication scalar and the at least one operand comprised in the operation program, and wherein the accelerating method further comprises executing each target microcode instruction in the plurality of target microcode instructions, so as to complete the dot multiplication operation.

12. The accelerating method according to claim 11, wherein the accelerator further comprises a data storage space configured to store a preset operand used to generate a microcode instruction, and wherein the generating the target microcode instruction corresponding to the target type operation according to the target type operation based on the at least one operand comprised in the operation program comprises:

storing the at least one operand obtained by parsing in the data storage space, and generating the target microcode instruction according to the target type operation, based on a storage address of the at least one operand and/or the preset operand in the data storage space, wherein the parsing result comprises a storage address of the target input data, and wherein, in response to the parsing result, controlling the calculating circuit to enable the calculating circuit to acquire the target input data and run the general logic circuit based on the target input data so as to complete the target type operation comprises:

controlling, according to the storage address of the target input data, the calculating circuit to read the target input data from the data storage space and performing the target type operation based on the target input data.

13. The accelerating method according to claim 11, wherein the basic logic circuit is to perform a modular addition operation and a modular multiplication operation, and the general logic circuit is to perform a modular multiplication on a calculation result of two modular addition operations;

wherein an input required by the general logic circuit comprises a first input, a second input, a third input and a fourth input; and wherein an operation process of the general logic circuit comprises:

performing a modular addition operation on the first input and the second input to obtain a first modular addition result;

performing a modular addition operation on the third input and the fourth input to obtain a second modular addition result; and performing a modular multiplication operation on the first modular addition result and the second modular addition result to obtain a final calculation result.

14. The accelerating method according to claim 13, wherein the at least one operand comprises a first operand and a second operand, and wherein the accelerating method further comprises:

in response to the target type operation being a modular addition operation on the first operand and the second operand, setting the first input to the first operand, setting the second input to the second operand, setting the third input to 1 and setting the fourth input to 0;

in response to the target type operation being a modular subtraction operation on the first operand and the second operand, setting the first input to the first operand, setting the second input to the second operand and adjusting a symbol corresponding to the second input to a negative sign, setting the third input to 1 and setting the fourth input to 0;

in response to the target type operation being a modular multiplication operation on the first operand and the second operand, setting the first input to the first operand, and setting the third input to the second operand, and setting the second input and the fourth input to 0;

in response to the target type operation being a modular addition squared operation on the first operand and the second operand, setting the first input and the third input to the first operand, and setting the second input and the fourth input to the second operand; and generating the target microcode instruction according to the first input, the second input, the third input and the fourth input.

15. The accelerating method according to claim 13, wherein the modular multiplication operation comprises a modular multiplication operation of a first type and a modular multiplication operation of a second type, wherein the accelerator further comprises:

a data storage space, wherein the data storage space stores a preset constant, wherein the preset constant is used to mutually convert between a first data field and a second data field, wherein the first data field is used for the modular multiplication operation of the first type and the second data field is used for the modular multiplication operation of the second type, and wherein the accelerating method further comprises:

in response to the modular multiplication operation converting from the first type to the second type, acquiring the preset constant and converting the first data field into the second data field according to the preset constant to implement the modular multiplication operation of the second type, and in response to the modular multiplication operation converting from the second type to the first type, acquiring the preset constant and converting the second data field into the first data field according to the preset constant to implement the modular multiplication operation of the first type.

16. A non-transitory computer-readable storage medium, wherein an accelerator in a computer comprises a memory, a processor, and a computer program stored on the memory and operable on the processor, wherein the processor, when running the computer program, is configured to: implement an operation related to an elliptic curves algorithm, wherein the operation related to the elliptic curves algorithm comprises a general logic operation composed of a basic logic operation, the general logic operation is to perform an operation of different operation types in response to different inputs, and the non-transitory computer-readable storage medium stores a computer program, the accelerator, when executing the computer program, is configured to:

acquire a target microcode instruction corresponding to a target type operation to be implemented, the target microcode instruction is generated according to the target type operation, wherein the target microcode instruction is used to indicate target input data required to perform the general logic operation to implement the target type operation;

parse the target microcode instruction to obtain a parsing result corresponding to the target input data; and in response to the parsing result, acquire the target input data and run the general logic operation based on the target input data so as to complete the target type operation;

wherein the accelerator is communicatively connected to a central processing unit (CPU), and the accelerator or the CPU is configured to:

acquire an operation program that performs the target type operation on at least one operand comprised in the operation program, and generate the target microcode instruction corresponding to the target type operation according to the target type operation based on the at least one operand comprised in the operation program;

wherein the operation program further comprises a dot multiplication scalar and the target type operation is a dot multiplication operation on the dot multiplication scalar and the at least one operand;

wherein the accelerator or the CPU is further configured to generate a plurality of target microcode instructions for implementing the dot multiplication operation according to the dot multiplication scalar and the at least one operand comprised in the operation program; and wherein the accelerator is further configured to execute each target microcode instruction in the plurality of target microcode instructions, so as to complete the dot multiplication operation.

* * * * *